(12) United States Patent
Qiu et al.

(10) Patent No.: US 12,370,895 B2
(45) Date of Patent: Jul. 29, 2025

(54) VEHICLE POWER SUPPLY DEVICE

(71) Applicant: BYD COMPANY LIMITED, Guangdong (CN)

(72) Inventors: Kun Qiu, Shenzhen (CN); Pengfei Li, Shenzhen (CN); Ziwei Zeng, Shenzhen (CN); Chaorui Wu, Shenzhen (CN); Daolin Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 719 days.

(21) Appl. No.: 17/780,818

(22) PCT Filed: Oct. 30, 2020

(86) PCT No.: PCT/CN2020/125177
§ 371 (c)(1),
(2) Date: May 27, 2022

(87) PCT Pub. No.: WO2021/103929
PCT Pub. Date: Jun. 3, 2021

(65) Prior Publication Data
US 2023/0001799 A1    Jan. 5, 2023

(30) Foreign Application Priority Data
Nov. 29, 2019   (CN) ......................... 201911200119.2

(51) Int. Cl.
*B60L 5/16*   (2006.01)
*B60L 5/12*   (2006.01)
(Continued)

(52) U.S. Cl.
CPC .................. *B60L 5/16* (2013.01); *B60L 5/12* (2013.01); *B60L 5/22* (2013.01); *B60L 5/28* (2013.01); *B60L 5/30* (2013.01); *B60L 5/32* (2013.01)

(58) Field of Classification Search
CPC ...... B60L 5/16; B60L 5/28; B60L 5/30; B60L 5/32; B60L 5/22; B60L 5/12
(Continued)

(56) References Cited

FOREIGN PATENT DOCUMENTS

| CN | 204633439 U | 9/2015 |
|---|---|---|
| CN | 205686323 U | * 11/2016 |

(Continued)

OTHER PUBLICATIONS

English Translation of International Search Report from PCT/CN2020/125177 dated Jan. 27, 2021 (3 pages).

*Primary Examiner* — S. Joseph Morano
*Assistant Examiner* — James William Jones
(74) *Attorney, Agent, or Firm* — Calfee, Halter & Griswold LLP (57) ABSTRACT

A vehicle power supply device is provided. The vehicle power supply device includes: a fixed base; a scissor-fork lifting mechanism, where the scissor-fork lifting mechanism is configured to be driven by a drive device to ascend or descend; and the scissor-fork lifting mechanism includes at least one scissor-fork swing rod set, the scissor-fork swing rod set includes at least one pair of swing rods, each pair of swing rods includes two swing rods that are cross-arranged and are hinged with each other, and two swing rods in a pair of swing rods that is closest to the fixed base are separately mounted on the fixed base; and a power supply head, where the power supply head is mounted on two swing rods in a pair of swing rods that is farthest from the fixed base, and the power supply head is driven by the scissor-fork lifting mechanism to ascend or descend.

19 Claims, 5 Drawing Sheets

(51) Int. Cl.
*B60L 5/22* (2006.01)
*B60L 5/28* (2006.01)
*B60L 5/30* (2006.01)
*B60L 5/32* (2006.01)

(58) Field of Classification Search
USPC .................................................. 191/66, 65
See application file for complete search history.

(56) References Cited

FOREIGN PATENT DOCUMENTS

| | | | | |
|---|---|---|---|---|
| CN | 107176039 | A | * | 9/2017 |
| CN | 206644656 | U | | 11/2017 |
| CN | 206644657 | U | * | 11/2017 |
| CN | 206983739 | U | | 2/2018 |
| CN | 109986970 | A | * | 7/2019 |
| CN | 209159432 | U | | 7/2019 |
| CN | 110481357 | A | * | 11/2019 |
| CN | 211493670 | U | | 9/2020 |
| JP | 6268002 | A | | 3/1987 |
| KR | 20110073726 | A | | 6/2011 |
| WO | WO-2010097278 | A2 | * | 9/2010 ................ B60L 5/12 |

* cited by examiner

VEHICLE POWER SUPPLY DEVICE

CROSS-REFERENCE TO RELATED APPLICATIONS

This application is the U.S. National Stage of PCT International Application No. PCT/CN2020/125177, filed on Oct. 30, 2020, which claims priority to and benefits of Chinese Patent Application No. 201911200119.2, entitled "VEHICLE POWER SUPPLY DEVICE" and filed by BYD Co., Ltd. on Nov. 29, 2019. The entire content of the above-referenced application is incorporated herein by reference.

FIELD

The present disclosure relates to the field of vehicle power supply technologies, and more specifically, to a vehicle power supply device.

BACKGROUND

Figure 1:
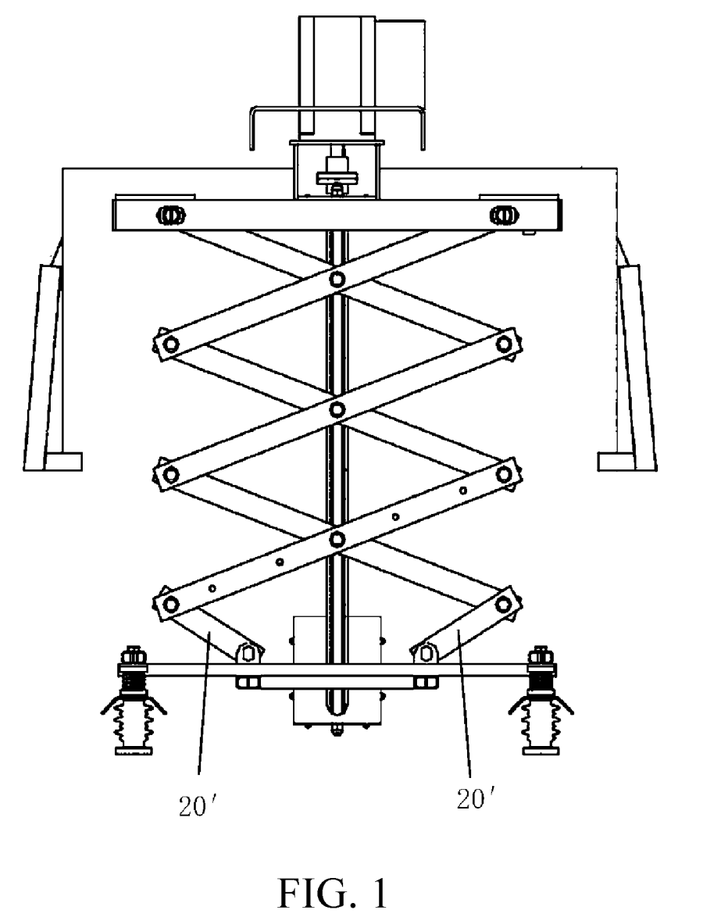
FIG. 1 is a schematic structural diagram of a vehicle power supply device in the related art.

A liftable power supply device is usually used for power supply in new energy vehicles in the related art. As shown in FIG. 1, ascending or descending of a power supply device is implemented by a scissor-fork lifting mechanism. An end of the scissor-fork lifting mechanism is additionally provided with two small swing rods 20'. The two small swing rods 20' are not cross-connected but are directly hinged with a power supply head. In this way, changeable swing of the power supply head is relatively large in a movement process, which is not conducive to the alignment during power supply.

SUMMARY

The present disclosure aims to resolve at least one of the technical problems existing in the related art. Accordingly, an objective of the present disclosure is to provide a vehicle power supply device. The vehicle power supply device can have advantages such as stable structure and movement, and favorable alignment for power supply.

According to an embodiment of the present disclosure, a vehicle power supply device is provided. The vehicle power supply device includes: a fixed base; a scissor-fork lifting mechanism, where the scissor-fork lifting mechanism is configured to be driven by a drive device to ascend or descend; the scissor-fork lifting mechanism includes at least one scissor-fork swing rod set, the scissor-fork swing rod set includes at least one pair of swing rods, each pair of swing rods includes two swing rods that are cross-arranged and are hinged with each other, and two swing rods in a pair of swing rods that is closest to the fixed base are separately mounted on the fixed base; and a power supply head, the power supply head is mounted on two swing rods in a pair of swing rods that is farthest from the fixed base, and the power supply head is driven by the scissor-fork lifting mechanism to ascend or descend.

According to the vehicle power supply device of this embodiment of the present disclosure, the two swing rods that are cross-arranged and are hinged with each other are connected with the fixed base and the power supply head, connection of the swing rods is stable, and the vehicle power supply device has advantages such as stable structure and movement, and favorable alignment for power supply.

In some examples of the present disclosure, one of the pair of swing rods that is closest to the fixed base is hinged on the fixed base, an other of the pair of swing rods that is closest to the fixed base is slidably mounted on the fixed base, and the other of the pair of swing rods that is closest to the fixed base is configured to be driven by the drive device to slide on the fixed base.

In some examples of the present disclosure, the fixed base is provided with a first guide rail, the other of the pair of swing rods that is closest to the fixed base is hinged with a first slide rod, the first slide rod is slidably engaged with the first guide rail, and the first slide rod is configured to slide along the first guide rail under the action of the drive device.

In some examples of the present disclosure, two opposite side surfaces of the first guide rail are respectively provided with first grooves extending along a length direction of the first guide rail, the first slide rod is provided with a first slider, and the first slider is configured with first clamping jaws that are respectively engaged with the first grooves.

In some examples of the present disclosure, one of the pair of swing rods that is farthest from the fixed base is hinged on the power supply head, and an other of the pair of swing rods that is farthest from the fixed base is slidably mounted on the power supply head.

In some examples of the present disclosure, the power supply head is provided with a second guide rail, the other of the pair of swing rods that is farthest from the fixed base is hinged with a second slide rod, and the second slide rod is slidably engaged with the second guide rail.

In some examples of the present disclosure, a position of the second slide rod is parallel to a position of the first slide rod.

In some examples of the present disclosure, two opposite side surfaces of the second guide rail are respectively provided with second grooves extending along a length direction of the second guide rail, the second slide rod is provided with a second slider, and the second slider is configured with second clamping jaws that are respectively engaged with the second grooves.

In some examples of the present disclosure, a number of scissor-fork swing rod sets are spaced apart along a front-rear direction, and the scissor-fork lifting mechanism further includes: connecting rods. The connecting rods are connected between two adjacent scissor-fork swing rod sets, to cause the number of scissor-fork swing rod sets to synchronously ascend or descend. One of the pair of swing rods that is closest to the fixed base in each of the scissor-fork swing rod sets is hinged on the fixed base, an other of the pair of swing rods that is closest to the fixed base in each of the scissor-fork swing rod sets is hinged with a first slide rod, one of the pair of swing rods that is farthest from the fixed base in each of the scissor-fork swing rod sets is hinged on the power supply head, and an other of the pair of swing rods that is farthest from the fixed base in each of the scissor-fork swing rod sets is hinged with a second slide rod.

In some examples of the present disclosure, the scissor-fork lifting mechanism further comprises a push rod, the push rod is connected with the first slide rod, and the drive device is mounted on the fixed base and drives a number of first slide rods by the push rod.

In some examples of the present disclosure, the drive device includes a drive unit and a transmission unit configured to convert rotational movement into linear movement, the drive unit and the transmission unit are stacked along a lifting direction of the scissor-fork lifting mechanism, and the drive unit is connected with the scissor-fork lifting mechanism by the transmission unit to drive the scissor-fork lifting mechanism to ascend or descend; and the drive device is mounted on the fixed base, and the transmission unit is arranged between the fixed base and the drive unit.

In some examples of the present disclosure, the drive device further includes: a housing. The housing is mounted on the fixed base, the transmission unit is arranged in the housing, and the drive unit is mounted in the housing and extends into the housing to be connected with the transmission unit.

The transmission unit includes: a driving screw, where the driving screw is in transmission connection with the drive unit and is driven by the drive unit to rotate; and a driven screw, where the driven screw is in threaded connection with the driving screw and converts rotational movement of the driving screw into linear movement of the driven screw, and the driven screw is connected with the scissor-fork lifting mechanism.

In some examples of the present disclosure, the drive unit is a motor, and the transmission unit further includes: a driving wheel, where the driving wheel is in transmission connection with a motor shaft of the motor; a driven wheel, where the driven wheel is in transmission connection with the driving screw; and a transmission belt, where the transmission belt is sleeved on the driving wheel and the driven wheel.

In some examples of the present disclosure, one of the driven screw and the housing is provided with a sliding groove and an other of the driven screw and the housing is provided with a sliding rib, and the sliding rib and the sliding groove are slidably engaged with each other and extend along an axial direction of the driven screw.

In some examples of the present disclosure, an end of the driven screw that is away from the driving screw is provided with a connector, and the driven screw is connected with the scissor-fork lifting mechanism by the connector.

In some examples of the present disclosure, the housing includes: a cylindrical body, where the driven screw is arranged in the cylindrical body; a plug, where the plug is arranged at an end of the cylindrical body, and an end of the driven screw that is away from the driving screw extends out from the plug; an intermediate cylinder, where the intermediate cylinder is arranged at an other end of the cylindrical body, and the driving screw is supported in the intermediate cylinder by a bearing; an intermediate cover, where the intermediate cover is arranged on the intermediate cylinder, and the drive unit is mounted on the intermediate cover; and an end cover, where the end cover is arranged on the intermediate cover, and the driving wheel, the driven wheel, and the transmission belt are arranged in the end cover.

In some examples of the present disclosure, the power supply head includes: a base frame, where the two swing rods in the pair of swing rods that is farthest from the fixed base are mounted on the base frame; support plates, where the support plates are mounted on the base frame by insulators; an electrode plate, where the electrode plate is mounted on a corresponding support plate; and a signal plate, where the signal plate is mounted on a corresponding support plate.

In some examples of the present disclosure, the electrode plate and the signal plate are respectively mounted on the corresponding support plates by elastic members.

In some examples of the present disclosure, two electrode plates are arranged in parallel and are spaced apart along a length direction of the electrode plates.

In some examples of the present disclosure, three signal plates are arranged in parallel and are spaced apart along a width direction of the signal plates, two electrode plates are arranged in parallel and are spaced apart along a width direction of the electrode plates, and the two electrode plates are respectively arranged on sides along a length direction of two outermost signal plates.

Additional aspects and advantages of the present disclosure will be given in the following description, some of which will become apparent from the following description or may be learned from practices of the present disclosure.

BRIEF DESCRIPTION OF THE DRAWINGS

The foregoing advantages of the present disclosure will become apparent and comprehensible in the embodiment description made with reference to the following accompanying drawings.

REFERENCE NUMERALS vehicle power supply device 1,
fixed base 100, first guide rail 110, first groove 111,
scissor-fork lifting mechanism 200, scissor-fork swing rod set 210, swing rod 211, first slide rod 240, first slider 241, first clamping jaw 242, second slide rod 250, second slider 251, connecting rod 260,
power supply head 300, second guide rail 310, second groove 311, base frame 320, support plate 330, electrode plate 340, signal plate 350, elastic member 360, insulator 370,
drive device 400, push rod 410,
drive unit 700,
transmission unit 800, driving screw 810, external thread 811, driven screw 820, internal thread 821, driving wheel 830, driven wheel 840, transmission belt 850, connector 860, sliding groove 870, sliding rib 880,
housing 900, cylindrical body 910, plug 920, intermediate cylinder 930, bearing 931, intermediate cover 940, and end cover 950.

DETAILED DESCRIPTION

Embodiments of the present disclosure are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "center", "on", "under", "front", "rear", "left", "right", "top", and "bottom", are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

In the description of the present disclosure, "a number of" means two or more than two, and "several" means one or more.

A vehicle power supply device 1 according to the embodiments of the present disclosure is described below with reference to the accompanying drawings. The vehicle power supply device 1 may be used as a current collecting device and connected with a vehicle, and may alternatively be used as a current supply device and connected with a charger.

Figure 2:
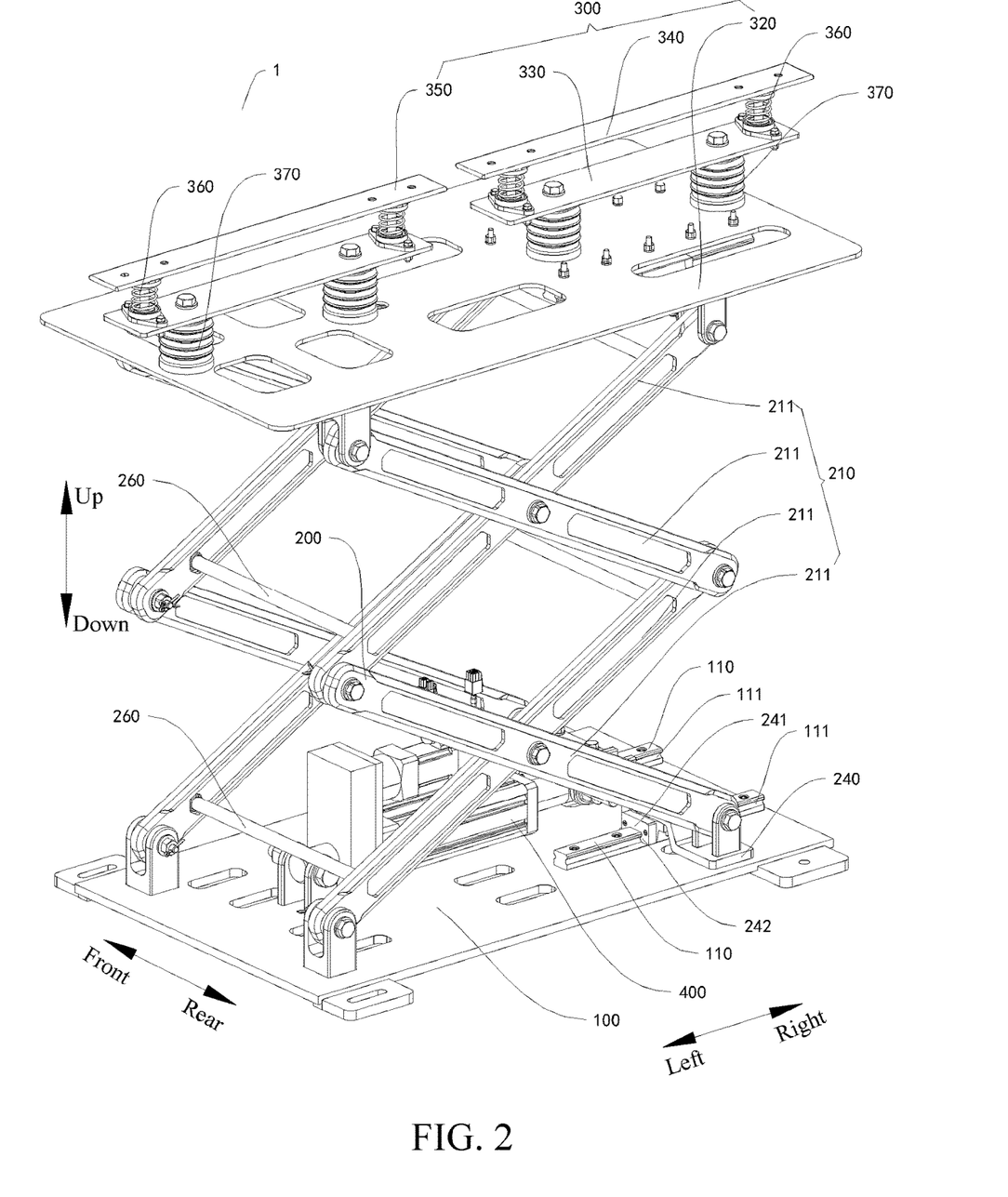
FIG. 2 is a schematic structural diagram of a vehicle power supply device according to an embodiment of the present disclosure.
Figure 3:
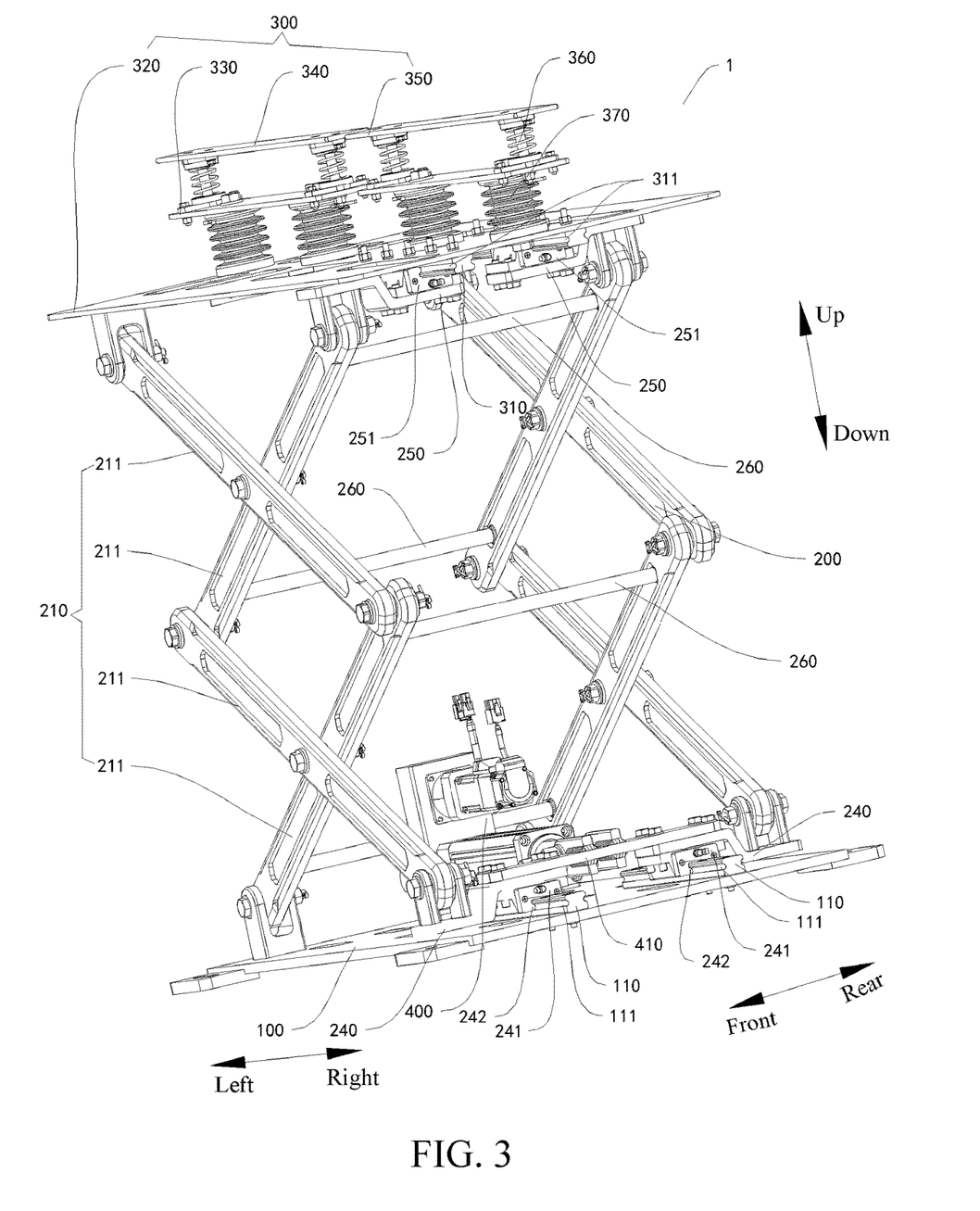
FIG. 3 is a schematic structural diagram of a vehicle power supply device viewed from another angle according to an embodiment of the present disclosure.

As shown in FIG. 2 and FIG. 3, the vehicle power supply device 1 according to this embodiment of the present disclosure includes a fixed base 100, a scissor-fork lifting mechanism 200, and a power supply head 300.

The scissor-fork lifting mechanism 200 is configured to be driven by a drive device 400 to ascend or descend. The scissor-fork lifting mechanism 200 includes at least one scissor-fork swing rod set 210, the scissor-fork swing rod set 210 includes at least one pair of swing rods 211, each pair of swing rods 211 includes two swing rods 211 that are cross-arranged and are hinged with each other, and two swing rods 211 in a pair of swing rods 211 that is closest to the fixed base 100 are separately mounted on the fixed base 100. The power supply head 300 is mounted on two swing rods 211 in a pair of swing rods 211 that is farthest from the fixed base 100, and is driven by the scissor-fork lifting mechanism 200 to ascend or descend.

Specifically, the fixed base 100 is horizontally arranged, and the scissor-fork lifting mechanism 200 is mounted on the fixed base 100 and may be contracted or extended along a vertical direction. The scissor-fork swing rod set 210 includes at least one pair of swing rods 211, each pair of swing rods 211 includes two swing rods 211 that are cross-arranged and are hinged with each other, and ends of swing rods 211 of two adjacent pairs of swing rods 211 are separately hinged. By these hinging points, the swing rods 211 may be folded and unfolded, thereby implementing extending and contracting. The two swing rods 211 connected with the power supply head 300 are arranged on a horizontal plane on a side of the power supply head 300 close to the fixed base 100, and are respectively adjacent to a left end and a right end of the power supply head 300.

As shown in FIG. 1, an end of a scissor-fork lifting mechanism of a new energy vehicle in the related art is additionally provided with two small swing rods 20'. The two small swing rods 20' are not cross-connected but are directly hinged with a power supply head. In this way, changeable swing of the power supply head is relatively large in a movement process, which is not conducive to the alignment during power supply.

For the vehicle power supply device 1 according to this embodiment of the present disclosure, by connecting the power supply head 300 with the ends of the two swing rods 211 of the scissor-fork lifting mechanism 200, the swing rods 20' in the related art are saved. In this way, the structure is simpler, and the two swing rods 211 are cross-arranged, so that the power supply head 300 can move more smoothly and swing of the power supply head 300 is reduced, thereby facilitating the alignment during power supply and improving the reliability of power supply performance.

Therefore, the vehicle power supply device 1 according to this embodiment of the present disclosure can have advantages such as stable structure and movement, and favorable alignment for power supply.

In some specific embodiments of the present disclosure, as shown in FIG. 2 and FIG. 3, one of the pair of swing rods 211 that is closest to the fixed base 100 is hinged on the fixed base 100, and an other of the pair of swing rods 211 that is closest to the fixed base 100 is slidably mounted on the fixed base 100. The other of the pair of swing rods 211 that is closest to the fixed base 100 is configured to be driven by the drive device 400 to slide on the fixed base 100.

Specifically, the fixed base 100 is provided with a first guide rail 110, the other of the pair of swing rods 211 that is closest to the fixed base 100 is hinged with a first slide rod 240, the first slide rod 240 is slidably engaged with the first guide rail 110, and the first slide rod 240 slides along the first guide rail 110 under the action of the drive device 400.

In an embodiment, two opposite side surfaces of the first guide rail 110 are respectively provided with first grooves 111 extending along a length direction of the first guide rail 110, the first slide rod 240 is provided with a first slider 241, and the first slider 241 is configured with first clamping jaws 242 that are respectively engaged with the first grooves 111.

For example, two lowermost swing rods 211 of the scissor-fork swing rod set 210 have one swing rod 211 hinged with the fixed base 100 and an other swing rod 211 hinged with the first slide rod 240. A front side and a rear side of the first guide rail 110 are respectively provided with the first grooves 111, and the first grooves 111 extend along a left-right direction. The first slide rod 240 is provided with the first slider 241, and the first slider 241 may be connected with the first slide rod 240 by a threaded fastener (for example, a bolt). The first slider 241 is configured with the first clamping jaw 242, and the first clamping jaw 242 is slidably engaged with the first groove 111. The first clamping jaw 242 cannot separate due to being blocked by an upper wall of the first groove 111, and can only slide along a length direction of the first groove 111.

Therefore, through the arrangement of the first guide rail 110 and the first slide rod 240, the other of the pair of swing rods 211 that is closest to the fixed base 100 is slidably mounted on the fixed base 100, and the first guide rail 110 is provided with the first groove 111. The first slide rod 240 is provided with the first slider 241 including the first clamping jaw 242. Through the engagement between the first clamping jaw 242 and the first groove 111, the stability of the first slide rod 240 on the first guide rail 110 can be ensured, and the first slide rod 240 can be prevented from separating from the first guide rail 110.

In some specific embodiments of the present disclosure, as shown in FIG. 2 and FIG. 3, one of the pair of swing rods 211 that is farthest to the fixed base 100 is hinged on the power supply head 300, and an other of the pair of swing rods 211 that is farthest to the fixed base 100 is slidably mounted on the power supply head 300.

Specifically, the power supply head 300 is provided with a second guide rail 310, the other of the pair of swing rods 211 that is farthest from the fixed base 100 is hinged with a second slide rod 250, and the second slide rod 250 is slidably engaged with the second guide rail 310.

In an embodiment, two opposite side surfaces of the second guide rail 310 are respectively provided with second grooves 311 extending along a length direction of the second guide rail 310, the second slide rod 250 is provided with a second slider 251, and the second slider 251 is configured with second clamping jaws (not shown in the figure) that are respectively engaged with the second grooves 311.

For example, two uppermost swing rods 211 of the scissor-fork swing rod set 210 have one swing rod 211 hinged with the power supply head 300 and an other swing rod 211 hinged with a rear end of the second slide rod 250. A front side and a rear side of the second guide rail 310 are provided with the second grooves 311, and the second grooves 311 extend along a left-right direction. The second slide rod 250 is provided with the second slider 251, and the second slider 251 may be connected with the second slide rod 250 by a threaded fastener (for example, a bolt). The second slider 251 is configured with the second clamping jaw, and the second clamping jaw is slidably engaged with the second groove 311. The second clamping jaw cannot separate due to being blocked by a lower wall of the second groove 311, and can only slide along a length direction of the second groove 311.

Therefore, through the arrangement of the second guide rail 310 and the second slide rod 250, the other of the pair of swing rods 211 that is farthest to the fixed base 100 is slidably mounted on the power supply head 300, and the second guide rail 310 is provided with the second groove 311. The second slide rod 250 is provided with the second slider 251 including the second clamping jaw. Through the engagement between the second clamping jaw and the second groove 311, the stability of the second slide rod 250 on the second guide rail 310 can be ensured, and the second slide rod 250 can be prevented from separating from the second guide rail 310.

To ensure the stability of the power supply head 300, a position of the second slide rod 250 and a position of the first slide rod 240 may be correspondingly arranged. For example, an example in which both the second slide rod 250 and the first slide rod 240 are arranged on a right side of the scissor-fork lifting mechanism 200 is shown in the accompanying drawings.

In some specific embodiments of the present disclosure, as shown in FIG. 2 and FIG. 3, a number of scissor-fork swing rod sets 210 may be spaced apart along a front-rear direction. The scissor-fork lifting mechanism 200 includes connecting rods 260, and the connecting rods 260 are connected between two adjacent scissor-fork swing rod sets 210 along the front-rear direction, to cause the number of scissor-fork swing rod sets 210 to synchronously ascend or descend. For example, the connecting rods 260 are respectively connected with swing rods 211 arranged on an inner side of the two adjacent scissor-fork swing rod sets 210.

One of the pair of swing rods 211 that is closest to the fixed base 100 in each of the scissor-fork swing rod sets 210 is hinged on the fixed base 100, an other of the pair of swing rods 211 that is closest to the fixed base 100 in each of the scissor-fork swing rod sets 210 is hinged with a first slide rod 240, one of the pair of swing rods 211 that is farthest from the fixed base 100 in each of the scissor-fork swing rod sets 210 is hinged on the power supply head 300, and an other of the pair of swing rods 211 that is farthest from the fixed base 100 in each of the scissor-fork swing rod sets 210 is hinged with a second slide rod 250.

For example, a number of scissor-fork swing rod sets 210 are spaced apart along a front-rear direction. A number of connecting rods 260 are respectively connected with swing rods 211 arranged on an inner side of two adjacent scissor-fork swing rod sets 210 along the front-rear direction. For an uppermost pair of swing rods 211 of the number of scissor-fork swing rod sets 210, a swing rod 211 on a left side is hinged on the power supply head 300, and a swing rod 211 on a right side is hinged on the second slide rod 250. For a lowermost pair of swing rods 211 of the number of scissor-fork swing rod sets 210, a swing rod 211 on a left side is hinged on the fixed base 100, and a swing rod 211 on a right side is hinged on the first slide rod 240.

In this way, the arrangement of the number of scissor-fork swing rod sets 210 can improve the stability of the power supply head 300 during ascending and descending. The arrangement of the connecting rod 260 can stabilize relative positions of the number of scissor-fork swing rod sets 210, thereby improving the stability of the scissor-fork lifting mechanism 200.

In an embodiment, the scissor-fork lifting mechanism 200 further includes a push rod 410, and the push rod 410 is connected between first slide rods 240 of the two adjacent scissor-fork swing rod sets 210. The drive device 400 is mounted on the fixed base 100 and drives the number of first slide rods 240 by the push rod 410.

A person skilled in the art may understand that, in the foregoing embodiment in which two or more scissor-fork swing rod sets 210 are arranged, a push rod 410 may be arranged between first slide rods 240 of each two adjacent scissor-fork swing rod sets 210. In other words, the quantity of push rods 410 is one less than the quantity of scissor-fork swing rod sets 210, and is the same as the quantity of first slide rods 240. When a number of push rods 410 are arranged, the number of push rods 410 are all connected with the drive device 400, to cause the drive device 400 to drive the number of push rods 410 to synchronously drive the number of first slide rods 240.

Optionally, the push rod 410 is arranged parallel to the fixed base 100. In this way, the working efficiency of the drive device 400 is the highest, the first slide rod 240 and the first guide rail 110 are not prone to be damaged, and the structure is stable. In addition, the drive device 400 pushes the first slide rod 240 horizontally, so that the stability of the power supply head 300 during movement may be further improved.

Certainly, the push rod 410 may alternatively be arranged at a specific angle to the fixed base 100, provided that it is ensured that the push rod 410 can be normally extended and contracted.

Figure 4:
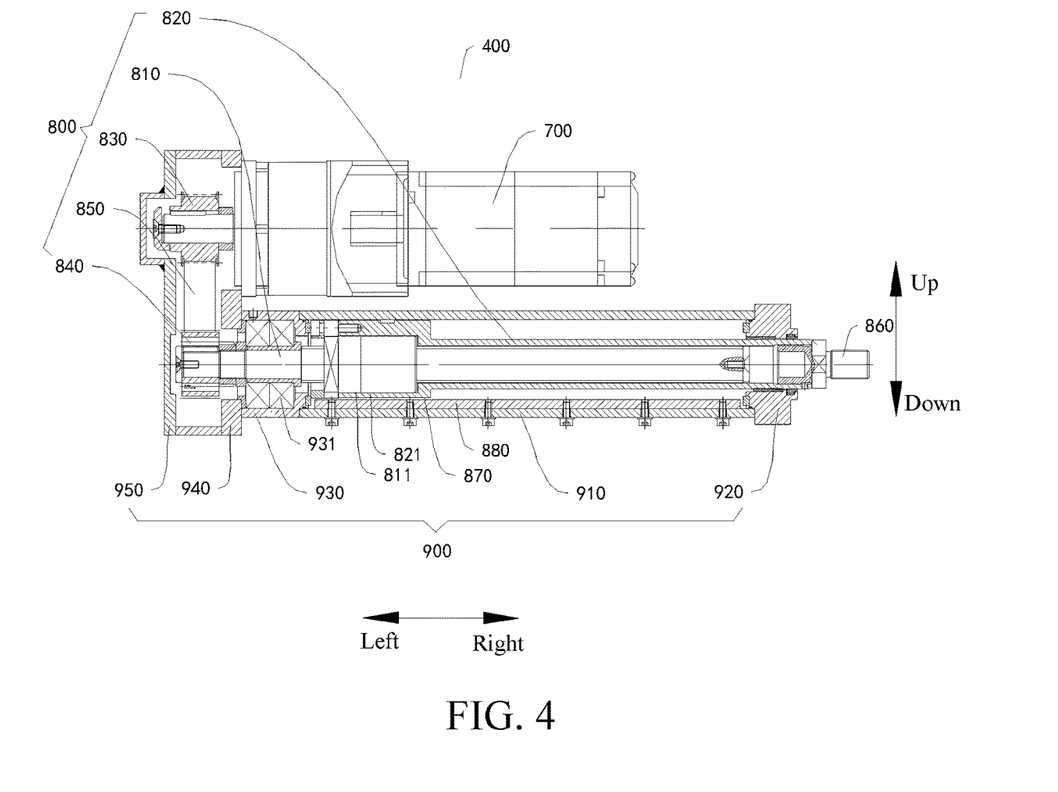
FIG. 4 is a schematic structural diagram of a drive device of a vehicle power supply device according to an embodiment of the present disclosure.

In some specific embodiments of the present disclosure, as shown in FIG. 2 to FIG. 4, the drive device 400 includes a drive unit 700 and a transmission unit 800 configured to convert rotational movement into linear movement. The drive unit 700 and the transmission unit 800 are stacked along a lifting direction of the scissor-fork lifting mechanism 200. For example, the drive unit 700 and the transmission unit 800 are stacked along an up-down direction. The drive unit 700 is connected with the scissor-fork lifting mechanism 200 by the transmission unit 800 to drive the scissor-fork lifting mechanism 200 to ascend or descend.

The drive device 400 of the vehicle power supply device 1 according to this embodiment of the present disclosure includes the drive unit 700 and the transmission unit 800, and the transmission unit 800 can convert the rotational movement into the linear movement. Therefore, due to a change of a transmission path of a driving force, forms of the drive unit 700 can be more diverse, for example, a manner other than hydraulic pressure, such as a motor, may be used.

In addition, because the drive unit 700 is connected with the scissor-fork lifting mechanism 200 by the transmission unit 800 capable of changing a force transmission path, that is, the drive unit 700 is not directly connected with the scissor-fork lifting mechanism 200, when the drive device 400 drives the scissor-fork lifting mechanism 200 to ascend or descend, the drive unit 700 of the drive device does not swing accordingly, so that the stability is improved, and the smoothness of the movement of the power supply head 300 is improved, thereby facilitating the alignment during charging.

In addition, because the drive device 400 integrates the transmission unit 800 and based on a change made by the transmission unit 800 to a driving force path, the arrangement of the drive unit 700 and the transmission unit 800 may be more flexible, that is, the drive unit 700 and the transmission unit 800 are stacked along a lifting direction of the scissor-fork lifting mechanism 200. To satisfy the ascending and descending of the scissor-fork lifting mechanism 200, sufficient space needs to be reserved along a lifting direction of the scissor-fork lifting mechanism 200, and the drive unit 700 and the transmission unit 800 are stacked along the direction, so that space along the lifting direction of the scissor-fork lifting mechanism 200 may be fully utilized, and horizontal space occupied by the drive device 400 may be reduced, thereby improving the utilization of space, which is beneficial to the arrangement of an overall structure of the vehicle power supply device 1. In addition, when the scissor-fork lifting mechanism 200 is in a folded state, specific space is still required along the lifting direction to accommodate the scissor-fork lifting mechanism 200 in the folded state. Provided that it is ensured that an overall height of the drive unit 700 and the transmission unit 800 after being stacked is less than a height of the scissor-fork lifting mechanism 200 in the folded state, the folding of the scissor-fork lifting mechanism 200 may not be affected. That is, when the drive unit 700 and the transmission unit 800 are stacked, not only the occupied horizontal space is reduced, but also an overall height of the vehicle power supply device 1 is not affected along a height direction.

In some specific examples of the present disclosure, as shown in FIG. 3, an example in which the drive unit 700 is a servo motor is shown in the accompanying drawings, and the transmission unit 800 is in transmission connection with the first slide rod 240 by the push rod 410. Specifically, in the transmission unit 800, a driven screw 820 is connected with the push rod 410 by a connector 860 on the driven screw. When performing linear movement, the driven screw 820 drives the push rod 410 to perform linear movement, thereby driving the first slide rod 240 to slide along the first guide rail 110. The arrangement of the connector 860 not only facilitates connection between the driven screw 820 and the push rod 410, but also is suitable for connection of push rods 410 with different specifications. The push rod 410 and the first slide rod 240 may be connected by a threaded fastener, such as a bolt. The drive device 400 transmits a driving force to the first slide rod 240 by the push rod 410, thereby driving the entire scissor-fork lifting mechanism 200 to ascend or descend.

Therefore, the vehicle power supply device 1 according to this embodiment of the present disclosure has advantages such as high stability and favorable arrangement of an overall structure.

In some specific embodiments of the present disclosure, as shown in FIG. 2 to FIG. 4, the drive device 400 is mounted on the fixed base 100, and the transmission unit 800 is arranged between the fixed base 100 and the drive unit 700. For example, the fixed base 100 is horizontally arranged, the scissor-fork lifting mechanism 200 is arranged on an upper surface of the fixed base 100, and the drive device 400 is mounted on the upper surface of the fixed base 100 and is arranged below the scissor-fork lifting mechanism 200. The transmission unit 800 is arranged above the fixed base 100, and the drive unit 700 is arranged above the transmission unit 800. Therefore, the drive device 400 may be stably fixed on the fixed base 100 and has the position remaining unchanged during operation, an arrangement manner of the drive unit 700 and the transmission unit 800 takes up relatively small space, and the output of the driving force is more stable.

Specifically, the drive device 400 further includes a housing 900, the housing 900 is mounted on the fixed base 100, the transmission unit 800 is arranged in the housing 900, and the drive unit 700 is mounted in the housing 900 and extends into the housing 900 to be connected with the transmission unit 800. The housing 900 can not only fix the drive device 400 on the fixed base 100 as a whole, but also integrate the drive unit 700 and the transmission unit 800 into a whole and play a protective role.

In some specific examples of the present disclosure, as shown in FIG. 4, the transmission unit 800 includes a driving screw 810 and a driven screw 820.

The driving screw 810 is in transmission connection with the drive unit 700 and is driven by the drive unit 700 to rotate. The driven screw 820 is in threaded connection with the driving screw 810 and converts rotational movement of the driving screw 810 into linear movement of the driven screw 820. The driven screw 820 is connected with the scissor-fork lifting mechanism 200.

For example, the driven screw 820 is in a hollow structure, the driving screw 810 extends into the driven screw 820, the driving screw 810 is configured with an external thread 811, and the driven screw 820 is configured with an internal thread 821 engaged with the external thread 811. The external thread 811 and the internal thread 821 may be respectively configured on portions of the driving screw 810 and the driven screw 820 with relatively large diameters.

Therefore, the drive unit 700 drives the driving screw 810 to rotate. When the driving screw 810 rotates, the driven screw 820 is driven to linearly move, and the scissor-fork lifting mechanism 200 is driven to ascend or descend by using the linear movement of the driven screw 820.

Specifically, one of the driven screw 820 and the housing 900 is provided with a sliding groove 870 and an other of the driven screw and the housing 900 is provided with a sliding rib 880. The sliding rib 880 and the sliding groove 870 are slidably engaged with each other and extend along an axial direction of the driven screw 820.

For example, the sliding groove 870 is arranged on an outer peripheral surface of a portion with a relatively large diameter of the driven screw 820 and extends along an axial direction of the driven screw 820. The sliding rib 880 is arranged on the housing 900, and a length of the sliding rib 880 is relatively large. The sliding rib 880 is slidably engaged with the sliding groove 870 to circumferentially position the driven screw 820, prevent the driven screw 820 from rotating, and allow the driven screw 820 to slide along an axial direction. In this way, when the driving screw 810 rotates, the driven screw 820 linearly moves. To ensure the reliability of the engagement between the sliding rib 880 and the sliding groove 870, the sliding groove 870 may be arranged on a lower surface of the driven screw 820, and correspondingly, the sliding rib 880 is arranged on a bottom wall of the housing 900.

In some embodiments of the present disclosure, as shown in FIG. 4, the drive unit 700 is a motor, and the transmission unit 800 further includes a driving wheel 830, a driven wheel 840, and a transmission belt 850.

The driving wheel 830 is in transmission connection with a motor shaft of the motor, the driven wheel 840 is in transmission connection with the driving screw 810, and the transmission belt 850 is sleeved on the driving wheel 830 and the driven wheel 840.

After the motor runs, the motor shaft drives the driving wheel 830 to rotate, the driving wheel 830 drives the driven wheel 840 to rotate by the transmission belt 850, and the driven wheel 840 drives the driving screw 810 to rotate.

Therefore, the drive unit 700 and the transmission unit 800 may be arranged side by side, that is, arranged in parallel along an axial direction, so that the drive unit 700 is arranged above the transmission unit 800 to construct a stacked arrangement manner.

A person skilled in the art may understand that, in an embodiment of the present disclosure, a specific form of the transmission unit 800 is not limited to the combination of a screw and a belt, and may alternatively be in the form of one of or a combination of more than one of a screw, a gear, a belt, and a rope pulley.

In some specific examples of the present disclosure, as shown in FIG. 4, the housing 900 includes a cylindrical body 910, a plug 920, an intermediate cylinder 930, an intermediate cover 940, and an end cover 950.

The driven screw 820 is arranged in the cylindrical body 910, and the sliding rib 880 may be arranged on the cylindrical body 910. The plug 920 is arranged at an end of the cylindrical body 910, and an end of the driven screw 820 that is away from the driving screw 810 extends out from the plug 920. The intermediate cylinder 930 is arranged at an other end of the cylindrical body 910, and the driving screw 810 is supported in the intermediate cylinder 930 by the bearing 931. The intermediate cover 940 is arranged on the intermediate cylinder 930, and the drive unit 700 is mounted on the intermediate cover 940. The end cover 950 is arranged on the intermediate cover 940, and the driving wheel 830, the driven wheel 840, and the transmission belt 850 are arranged in the end cover 950.

Therefore, the housing 900 integrates the drive unit 700 and the transmission unit 800 into a whole, and the separate arrangement of the housing 900 facilitates the disassembly and assembly of the drive device 400 and facilitates later maintenance.

An end of the driven screw 820 that is away from the driving screw 810 (that is, an end extending out from the plug 920) is provided with a connector 860, and the driven screw 820 is connected with the scissor-fork lifting mechanism 200 by the connector 860.

In some specific embodiments of the present disclosure, as shown in FIG. 2 and FIG. 3, the power supply head 300 includes a base frame 320, support plates 330, a signal plate 350, and an electrode plate 340.

Two swing rods 211 of the pair of swing rods 211 that is farthest from the fixed base 100 are mounted on the base frame 320, and the support plates 330 are mounted on the base frame 320 by insulators 370. The electrode plate 340 and the signal plate 350 are respectively mounted on the corresponding support plates 330. For example, the electrode plate 340 and the signal plate 350 are respectively mounted on the corresponding support plates 330 by elastic members 360. The elastic member 360 may be a compression spring, a leaf spring, or a plastic elastic member.

A person skilled in the art may understand that quantities and arrangement positions of support plates 330, electrode plates 340, signal plates 350, elastic members 360, and insulators 370 may be all set according to actual needs.

For example, as shown in FIG. 2, the power supply head 300 may not be provided with the signal plate 350, and two electrode plates 340 are arranged in parallel and are spaced apart along the length direction of the electrode plates 340 (for example, the left-right direction in FIG. 2).

Figure 5:
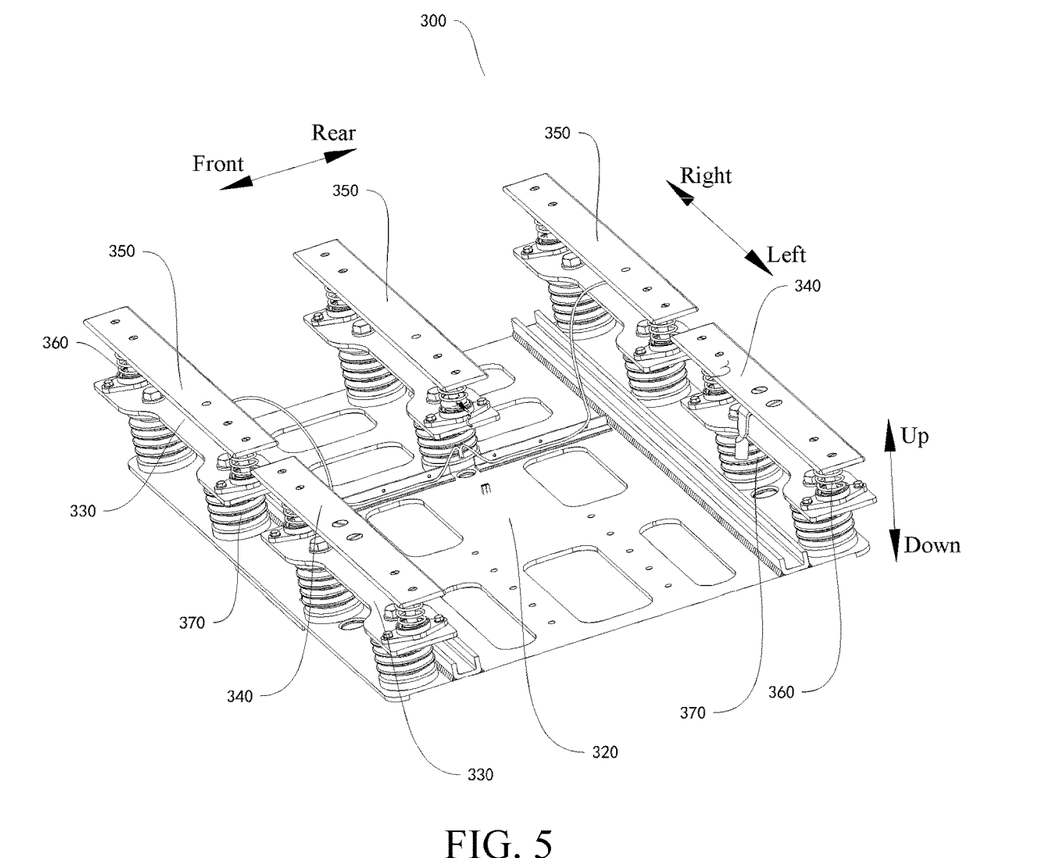
FIG. 5 is a schematic structural diagram of a power supply head of a vehicle power supply device according to another embodiment of the present disclosure.

In another example, as shown in FIG. 5, three signal plates 350 are arranged in parallel and are spaced apart along a width direction of the signal plate 350 (for example, the front-rear direction in FIG. 5). Two electrode plates 340 are arranged in parallel and are spaced apart along a width direction of the electrode plates 340, and the two electrode plates 340 are respectively arranged on sides along a length direction of two outermost signal plates 350.

For the vehicle power supply device 1 according to this embodiment of the present disclosure, active control of a charging process is implemented, unnecessary charging times are reduced, and service life of a charging device and a battery is prolonged. After a vehicle pulls into a station, the vehicle may be charged down according to the charging need, so that the impact and impact noise among charging devices are avoided when the vehicle pulls into the station, and the power supply head smoothly ascends and descends, which is conducive to the alignment during power supply.

In the description of this specification, description of reference terms such as "a specific embodiment" or "a specific example", means including specific features, structures, materials, or features described in the embodiment or example in at least one embodiment or example of the present disclosure. In this specification, schematic descriptions of the foregoing terms do not necessarily point at a same embodiment or example.

Although the embodiments of the present disclosure have been shown and described, a person of ordinary skill in the art should be understood that various changes, modifications, replacements, and variations may be made to the embodiments without departing from the principles and spirit of the present disclosure, and the scope of the present disclosure is as defined by the appended claims and their equivalents.

What is claimed is:

1. A vehicle power supply device, comprising:
a fixed base;
a scissor-fork lifting mechanism, wherein the scissor-fork lifting mechanism is configured to be driven by a drive device to ascend or descend; and the scissor-fork lifting mechanism comprises at least one scissor-fork swing rod set, the scissor-fork swing rod set comprises at least one pair of swing rods, each pair of swing rods comprises two swing rods that are cross-arranged and are hinged with each other, and two swing rods in a pair of swing rods that is closest to the fixed base are separately mounted on the fixed base; and
a power supply head, wherein the power supply head is mounted on two swing rods in a pair of swing rods that is farthest from the fixed base, and the power supply head is driven by the scissor-fork lifting mechanism to ascend or descend,
wherein the drive device comprises a drive unit and a transmission unit configured to convert rotational movement into linear movement, the drive unit and the transmission unit are stacked along a lifting direction of the scissor-fork lifting mechanism, and the drive unit is connected with the scissor-fork lifting mechanism by the transmission unit to drive the scissor-fork lifting mechanism to ascend or descend; and
the drive device is mounted on the fixed base, and the transmission unit is arranged between the fixed base and the drive unit.

2. The vehicle power supply device according to claim 1, wherein one of the pair of swing rods that is closest to the fixed base is hinged on the fixed base, an other of the pair of swing rods that is closest to the fixed base is slidably mounted on the fixed base, and the other of the pair of swing rods that is closest to the fixed base is configured to be driven by the drive device to slide on the fixed base.

3. The vehicle power supply device according to claim 2, wherein the fixed base is provided with a first guide rail, the other of the pair of swing rods that is closest to the fixed base is hinged with a first slide rod, the first slide rod is slidably engaged with the first guide rail, and the first slide rod is configured to slide along the first guide rail under the action of the drive device.

4. The vehicle power supply device according to claim 3, wherein two opposite side surfaces of the first guide rail are respectively provided with first grooves extending along a length direction of the first guide rail, the first slide rod is provided with a first slider, and the first slider is configured with first clamping jaws that are respectively engaged with the first grooves.

5. The vehicle power supply device according to claim 3, wherein one of the pair of swing rods that is farthest from the fixed base is hinged on the power supply head, and an other of the pair of swing rods that is farthest from the fixed base is slidably mounted on the power supply head.

6. The vehicle power supply device according to claim 5, wherein the power supply head is provided with a second guide rail, the other of the pair of swing rods that is farthest from the fixed base is hinged with a second slide rod, and the second slide rod is slidably engaged with the second guide rail.

7. The vehicle power supply device according to claim 6, wherein a position of the second slide rod is parallel to a position of the first slide rod.

8. The vehicle power supply device according to claim 6, wherein two opposite side surfaces of the second guide rail are respectively provided with second grooves extending along a length direction of the second guide rail, the second slide rod is provided with a second slider, and the second slider is configured with second clamping jaws that are respectively engaged with the second grooves.

9. The vehicle power supply device according to claim 6, wherein a plurality of scissor-fork swing rod sets are spaced apart along a front-rear direction, and the scissor-fork lifting mechanism further comprises:
connecting rods, wherein the connecting rods are connected between two adjacent scissor-fork swing rod sets, to cause the plurality of scissor-fork swing rod sets to synchronously ascend or descend, wherein
one of the pair of swing rods that is closest to the fixed base in each of the scissor-fork swing rod sets is hinged on the fixed base, an other of the pair of swing rods that is closest to the fixed base in each of the scissor-fork swing rod sets is hinged with a first slide rod, one of the pair of swing rods that is farthest from the fixed base in each of the scissor-fork swing rod sets is hinged on the power supply head, and an other of the pair of swing rods that is farthest from the fixed base in each of the scissor-fork swing rod sets is hinged with a second slide rod.

10. The vehicle power supply device according to claim 9, wherein the scissor-fork lifting mechanism further comprises a push rod, the push rod is connected with the first slide rod, and the drive device is mounted on the fixed base and drives a plurality of first slide rods by the push rod.

11. The vehicle power supply device according to claim 1, wherein the drive device further comprises:
a housing, wherein the housing is mounted on the fixed base, the transmission unit is arranged in the housing, and the drive unit is mounted in the housing and extends into the housing to be connected with the transmission unit; and
the transmission unit comprises:
a driving screw, wherein the driving screw is in transmission connection with the drive unit and is driven by the drive unit to rotate; and
a driven screw, wherein the driven screw is in threaded connection with the driving screw and converts rotational movement of the driving screw into linear movement of the driven screw, and the driven screw is connected with the scissor-fork lifting mechanism.

12. The vehicle power supply device according to claim 11, wherein the drive unit is a motor, and the transmission unit further comprises:
a driving wheel, wherein the driving wheel is in transmission connection with a motor shaft of the motor;
a driven wheel, wherein the driven wheel is in transmission connection with the driving screw; and
a transmission belt, wherein the transmission belt is sleeved on the driving wheel and the driven wheel.

13. The vehicle power supply device according to claim 12, wherein the housing comprises:
a cylindrical body, wherein the driven screw is arranged in the cylindrical body;
a plug, wherein the plug is arranged at an end of the cylindrical body, and an end of the driven screw that is away from the driving screw extends out from the plug;
an intermediate cylinder, wherein the intermediate cylinder is arranged at an other end of the cylindrical body, and the driving screw is supported in the intermediate cylinder by a bearing;
an intermediate cover, wherein the intermediate cover is arranged on the intermediate cylinder, and the drive unit is mounted on the intermediate cover; and
an end cover, wherein the end cover is arranged on the intermediate cover, and the driving wheel, the driven wheel, and the transmission belt are arranged in the end cover.

14. The vehicle power supply device according to claim 11, wherein one of the driven screw and the housing is provided with a sliding groove and an other of the driven screw and the housing is provided with a sliding rib, and the sliding rib and the sliding groove are slidably engaged with each other and extend along an axial direction of the driven screw.

15. The vehicle power supply device according to claim 11, wherein an end of the driven screw that is away from the driving screw is provided with a connector, and the driven screw is connected with the scissor-fork lifting mechanism by the connector.

16. The vehicle power supply device according to claim 1, wherein the power supply head comprises:
a base frame, wherein the two swing rods in the pair of swing rods that is farthest from the fixed base are mounted on the base frame;
support plates, wherein the support plates are mounted on the base frame by insulators;
an electrode plate, wherein the electrode plate is mounted on a corresponding support plate; and
a signal plate, wherein the signal plate is mounted on a corresponding support plate.

17. The vehicle power supply device according to claim 16, wherein the electrode plate and the signal plate are respectively mounted on the corresponding support plates by elastic members.

18. The vehicle power supply device according to claim 16, wherein two electrode plates are arranged in parallel and are spaced apart along a length direction of the electrode plates.

19. The vehicle power supply device according to claim 16, wherein three signal plates are arranged in parallel and are spaced apart along a width direction of the signal plates, two electrode plates are arranged in parallel and are spaced apart along a width direction of the electrode plates, and the two electrode plates are respectively arranged on sides along a length direction of two outermost signal plates.

* * * * *